3,608,279
APPARATUS FOR SEPARATING FATTY ACID DISTILLATES FROM VEGETABLE OILS BY SELECTIVE CONDENSATION AND TEMPERATURE CONTROL
Richard W. West, Irwin, Pa., assignor to Carrier Corporation, Syracuse, N.Y.
Filed July 24, 1964, Ser. No. 384,935
Int. Cl. B01d 3/34
U.S. Cl. 55—219            3 Claims

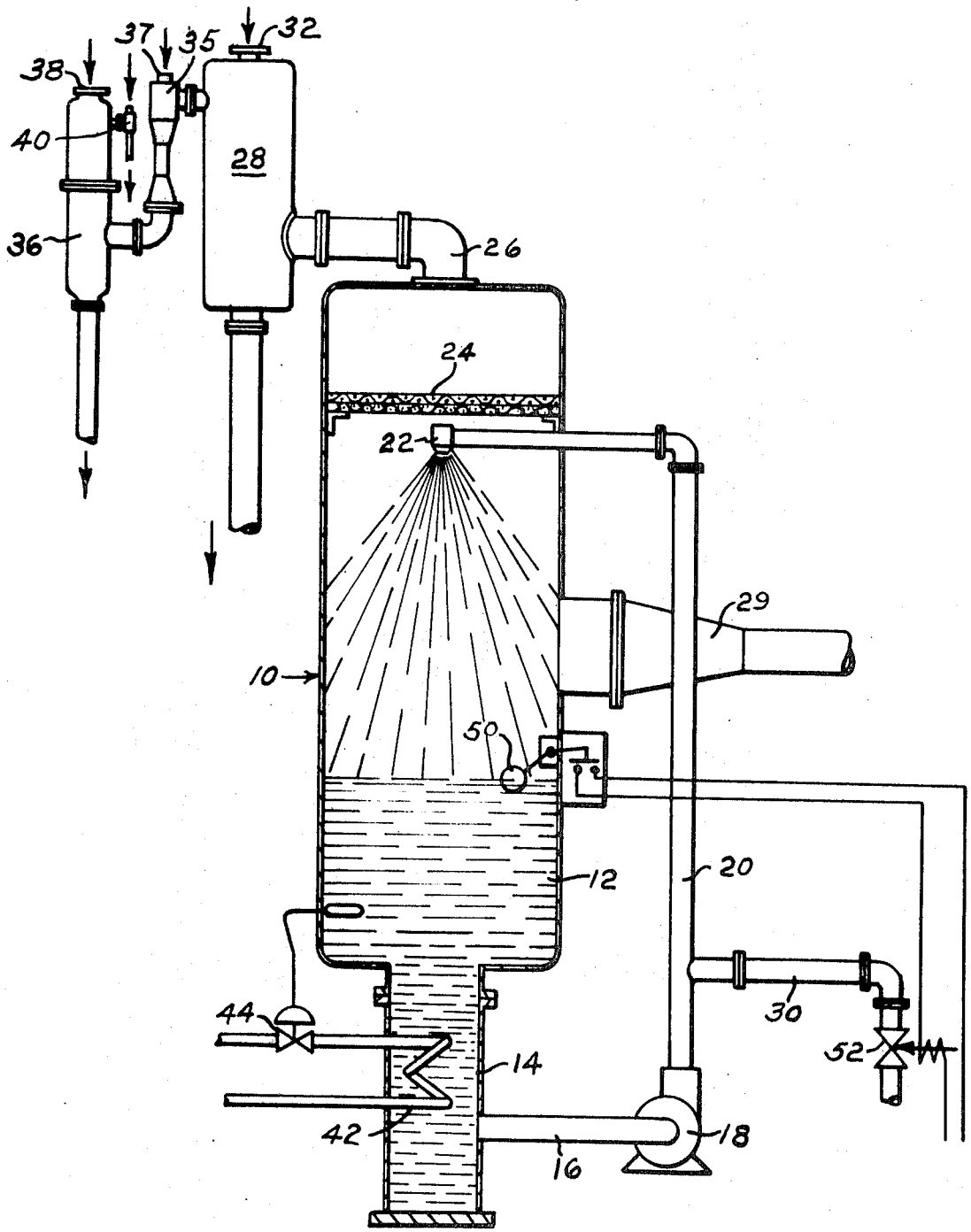

ABSTRACT OF THE DISCLOSURE

Apparatus for separating a condensable constituent from a vaporous mixture by passing liquid in heat transfer relation with the vaporous mixture in a vessel under pressure enabling the desired constituent only to be condensed, wherein the liquid is previously recovered condensate flowing in a separate circuit subject to temperature control by an automatically controlled heat exchanger located within the vessel.

---

This invention relates broadly to apparatus for and a method of separating from a fluid stream consisting of a plurality of gases, a vapor constituent of the fluid stream. More particularly, this invention relates to apparatus for and a method of recovering fatty acid distillates formed during a process employed for the purpose of refining natural vegetable and animal oils of the kind used in food shortenings.

In the process of refining vegetable oil as for example, soybean oil, it is necessary that certain fatty acids present in oil upon recovery from the soybean plant, be removed from the oil. This is usually accomplished in a deodorization step forming a part of the refining process. In the deodorization step the mixture containing the soybean oil and the fatty acids is subjected to heat and a flow of stripping steam in a container under vacuum so that the fatty acids in the solution are boiled off and leave the container with the stripping steam through a conduit subject to a second flow of steam introduced through an ejector or venturi provided for the purpose of maintaining the vacuum within the container in which the deodorization step is performed. The fatty acids in vapor form and stripping steam are thus induced to flow with the second flow of steam as a mixture.

The fatty acids purged from the vegetable oil mixture passing through the deodorization container are valuable and efforts have been made in the past to recover these fatty acids so separated through a condensation process involving relatively cold water supplied in heat transfer relation with the gases in a separation vessel, likewise maintained under a vacuum. The separation vessel is maintained under a vacuum of an order sufficient to permit the fatty acid vapors forming a part of the gas stream emanating from the deodorization vessel to be condensed, without effecting condensation of the steam serving as a carrier for the fatty acids in the vapor phase. The steam emanating from the separation vessel is condensed in a barometric condenser and the condensate therefrom passed to waste.

Difficulty has been encountered with apparatus of the kind described, mainly because the separation of the fatty acid distillates from the water used as the condensing medium has been inadequate with the result that additional processing is required to separate the distillate from the water. Efforts to separate the fatty acid distillates from the water include the addition of emulsifiers, heating of the mixture to a high temperature, and centrifuging of the mixture to separate the water and fatty acids.

Entrainment of condensed fatty acid distillate in the steam leaving the separation vessel has also been a problem. Baffles or eliminators tend to accumulate and hold liquid on the surface because the liquid is in fact an emulsion of a viscosity that drainage from the baffles is inhibited and accumulation of undesirable bodies of liquid on the baffle occurs. Under these circumstances, portions of the liquid at the surface of the undrained accumulations tend to be entrained in the steam flowing from the separation vessel to the barometric condenser.

It is a primary object of this invention to provide an apparatus for and a method of separating and recovering fatty acid distillates from a gas stream containing the fatty acids in the vapor phase and a carrier fluid such as steam by condensation of the fatty acids in such a manner that the maximum possible quantity of fatty acids are condensed consistent with partial pressure relationships and that entrainment of the fatty acid distillate by the carrier fluid flowing, after condensation has been effected, is maintained at an absolute minimum.

Another object of the invention is the provision of a method of separating and recovering fatty acid distillates of the kind under consideration in such a manner as to eliminate the need for centrifuging, emulsifiers, or other additional equipment heretofore employed when the fatty acid distillates have been recovered and mixed with the condensing fluid.

It is a further object of this invention to provide apparatus for and a method of recovering, through separation by condensation, fatty acid distillates from a gaseous mixture including the distillates in the vapor phase and a carrier fluid such as steam under circumstances where the collection of condensed distillate on a baffle member employed in the apparatus will drain back into the apparatus rather than congeal thereon and be carried to the barometric condenser by entrainment of the fatty acid distillate with the carrier fluid.

Another object of the invention is the provision of a method of recovering fatty acid distillates from a gaseous stream of the kind flowing from a deodorizer employed in the process of refining vegetable oil which comprises the steps of passing the gas stream in heat transfer relation with a water-free fluid such as the fatty acid distillates or a mixture of the fatty acid distillates and refined vegetable oil to condense from the gas stream the fatty acid distillates, utilizing the fatty acid distillates so condensed to continuously remove additional fatty acid distillates from the gas stream by condensation, regulating the temperature of the condensed fatty acid distillates to maintain equilibrium conditions and periodically withdrawing a portion of the recovered fatty acid distillates to maintain a predetermined supply of fatty acid distillates for use in condensing.

Other objects and features of the invention will be apparent upon a consideration of the ensuing specification and drawing depicting a separation vessel illustrating the invention.

As indicated above, the successful separation and recovery of fatty acid distillates from a gas stream containing the distillates as a vapor component thereof by condensation of the fatty acids requires apparatus which either prohibits or substantially eliminates the possibility of the formation within the separation vessel of an emulsion of the kind that will collect on eliminator or baffles necessary where the heat transfer is accomplished by the mass heat transfer principle. The gaseous mixture is caused to flow through a liquid spray in a separation vessel under temperature and pressure conditions such that the fatty acids condense and the remaining gas, usually steam and a small quantity of air flows to a separate condenser maintained at equilibrium conditions for steam.

Referring more particularly to the drawing, there is shown a separation vessel 10, known conventionally as a scrubber, in which the separation of the fatty acid distillates is accomplished by condensing them from a gas stream. The vessel 10 includes a portion 12 which serves as a sump for the collection of the fatty acid distillates which are then used as recirculating fluid in a recirculating circuit to be later described. Disposed below sump 12 in vessel 10 is a section 14 accommodating a heat exchanger for the purpose of regulating the temperature of the recirculation fluid. The recirculated fluid is withdrawn from section 14 and forwarded to a recirculation circuit including conduit 16 by a recirculating pump 18. The discharge of pump 18 flows through conduit 20 to a nozzle assembly 22 arranged in the upper portion of the vessel below baffle 24 placed adjacent outlet 26 provided for the purpose of passing steam heretofore used as a carrier for the fatty acid distillates to a barometric condenser 28. Cooling water is passed through a fitting 32 attached to barometric condenser 28 to condense the steam entering the barometric condenser from the outlet 26. Barometric condenser 28 is maintained under a vacuum through an ejector assembly 35 to which steam is fed through inlet 37. The steam used to operate ejector 35 is in turn condensed in a barometric condenser 36, subject to the flow of water through inlet 38 and maintained under a vacuum by second stage ejector 40, the discharge of which passed to waste.

A heat exchanger 42 is located in section 14 of vessel 10 and is employed normally for the purpose of absorbing the heat of condensation acquired by the recirculation fluid flowing in the recirculation fluid circuit. A control 44, shown as a valve, is provided to automatically regulate the temperature of the fluid in the recirculation circuit in order that the temperature of the recirculation fluid be maintained below the saturation temperature of the fatty acid distillates and above the saturation temperature of the steam supplied through a line 29 from a deodorization vessel, not shown. Equilibrium conditions are maintained additionally by regulating the pressure within vessel 10 through appropriate controls on the barometric condenser. These controls are well known in the art and a detailed description is thought unnecessary for an understanding of this invention.

In order to control the level of liquid in sump 12 a float control 50 is employed to regulate a valve 52 in product withdrawal line 30.

Considering the operation of the apparatus described, the separation vessel is subjected to a continuous flow of a recirculating fluid through lines 16, 20, pump 18, and spray member 22. Initially, the section 14 in sump 12 of vessel 10 is supplied with a charge of fluid which preferably may be the product from which the fatty acid distillates have been removed, previously recovered fatty acid distillates or a combination of the product and the distillates. To this end, it may be preferable to utilize a supply of soybean oil if this be the product with which the refinery is concerned. Vessel 10 is preferably evacuated to a pressure ranging between one and three inches of mercury absolute. The operation of the ejectors 35 and 40 assure a creation of such a vacuum. A valve (not shown) regulating the flow of fluid from the deodorization vessel is then opened to permit communication between line 29 and the separation vessel 10. As the gas stream flowing from line 29 enters vessel 10, heat transfer occurs between the gas stream and the liquid emanating in the form of a spray from the nozzles 22. The gas stream flowing in line 29 includes as a constituent, steam employed to maintain a vacuum in a deodorization container and as a constituent, the fatty acid distillates in the vapor phase. During the heat transfer action conducted under the mass heat transfer principle, a part of the fatty acid distillates condensed will be entrained by steam and will flow under the influence of the steam toward outlet 26. For this reason, the baffle or entrainment device 24 is arranged so as to prevent carryover of the fatty acid distillates in liquid form to the barometric condenser where they would be discharged into a sewage system as waste. The steam component of the gas mixture flowing in line 29 does not condense but rather passes out through outlet 26 to the barometric condenser which is maintained at a pressure suitable for condensation of the steam when passed in heat transfer relation with water entering barometric condenser 28 through fitting 32.

The fatty acid distillate that is condensed in vessel 10 for the most part drops by gravity to the sump 12 where it joins with the recirculation fluid flowing under the influence of pump 18. Heat exchanger 42 is employed for the purpose of absorbing the heat of condensation and thus maintain the fluid flowing in the recirculation circuit at a temperature sufficient to cause condensation when recirculated.

An additional feature of the invention involves the utilization of heat exchanger 42 to supply heat for the purpose of decreasing the viscosity of the recirculation fluid. Under circumstances where the separation vessel may be idle and subject to cool ambient temperatures, it will be appreciated the application of heat to the recirculation fluid will improve the flow characteristics of the fluid. It will also be appreciated that a portion of the recirculation fluid may be periodically withdrawn from the recirculation circuit through line 30. Water-free fluid is withdrawn since no steam can condense. Therefore, the withdrawn fluid is immediately available for use without additional processing. During operation of the separation vessel over a relatively long period of time, and with periodic withdrawal to maintain a predetermined level in sump 12, the liquid in the recirculation circuit will become highly concentrated in fatty acid distillates with the concentration of the vegetable or animal oil being reduced. In any circumstances, it will be appreciated that with the arrangement described, a water-free recirculation fluid is provided. This fact is important for it assures that the fluid deposited on the surface of baffle 24 in the manner described above possesses a viscosity conducive to prompt drainage from the baffle. As pointed out above, when water is employed as the heat transfer liquid in the separation vessel, it combines with fatty acid distillates to form a mixture having a viscosity which encourages a "build-up" of liquid rather than prompt drainage. An accumulation of liquid of this type increases the "carry-over" of liquid with steam flowing from the baffle to the barometric condenser. As pointed out above, it is impossible to eliminate liquid entrainment by the steam flowing through the vessel 10. This invention recognizes the entrainment problem and assures that "carry-over" from the surfaces is substantially eliminated.

Another feature of the invention is the entrainment device 24. It has been found that an entrainment device comprising a layer of stainless steel wire mesh overlying a layer comprising fiber glass threads interposed at random with stainless steel wire mesh provides a self-draining construction suitable for the purpose.

With the apparatus described, it has been discovered that separation of the fatty acid distillates from the gas stream entering the separation vessel through line 29, as determined by examining the product flowing from barometric condenser 28 is substantial. For example, it has been determined that less than one percent carry-over has been observed on many occasions.

The term fatty acid distillates is employed herein to cover compounds such as caproic, caprylic, capric, lauric myristic, palmitic, linoleic, oleic, and stearic acids which may be present individually or collectively in crude vegetable oils.

As indicated above, one of the important features of the invention involves the utilization of a heat transfer liquid, employed as a recirculation fluid, that possesses a viscosity conducive to normal pumping and draining characteristics when its temperature is controlled to obtain the optimum condensing and flowing temperature of the particular fatty acid mixture. It has been found that when the invention is practiced with soybean oil from which the following fatty acids have been removed, linoleic, oleic, palmitic, stearic, and myristic, the resulting liquid recirculation fluid has drained promptly from the baffle 24. The absence of water permits the separation and recovery process to operate continuously for it precludes the formation of an emulsion that changes the viscosity of the liquid to such an extent that fluid pumping and draining is no longer possible.

While I have described a preferred embodiment of the invention, it will be understood that the invention is not limited thereto since it may be otherwise embodied within the scope of the following claims.

I claim:

1. Apparatus for separating by condensation, fatty acid distillates forming in the vapor phase a constituent of a mixture of gases, comprising:
   (a) a separation vessel;
   (b) means maintaining a pressure within the vessel such that condensation of the fatty acid constituent of the gaseous mixture may be accomplished without condensation of the other constituent gases forming the gaseous mixture;
   (c) sump means located in said vessel for accommodating a water-free heat transfer fluid;
   (d) means for continuously recirculating a water-free heat transfer fluid through a portion of the separation vessel in heat exchange relation with the mixture of gases to condense the fatty acid constituents therefrom;
   (e) heat transfer means disposed within said sump for absorbing the heat of condensation from the heat transfer fluid;
   (f) control means associated with the heat transfer means regulating the temperature of the recirculating heat transfer fluid; and
   (g) means for periodically withdrawing the heat transfer fluid from the separation vessel to maintain a predetermined supply for continuous recirculation.

2. Apparatus as described in claim 1 including baffle means presenting surfaces for the disposition of liquid induced by the flow of the uncondensed gaseous mixture.

3. Apparatus as described in claim 2 wherein said baffle includes a layer of stainless steel wire mesh overlying a layer comprising fiber glass threads interposed at random with stainless steel wire mesh.

References Cited

UNITED STATES PATENTS

| | | | |
|---|---|---|---|
| 2,816,858 | 12/1957 | Walker | 202—160 |
| 2,462,013 | 2/1949 | Waterman | 203—42 |
| 2,793,235 | 5/1957 | Jenkinson | 203—42 |
| 2,921,646 | 1/1960 | Poole | 55—Agg |
| 2,997,131 | 8/1961 | Fisher | 55—527 |
| 3,061,622 | 10/1962 | Fiala | 203—42 |
| 3,066,462 | 12/1962 | Yap et al. | 55—Agg |
| 3,183,645 | 5/1965 | Teller | 55—259 |
| 3,284,435 | 11/1966 | McIlroy et al. | 55—259 |
| 3,303,006 | 2/1967 | Morley et al. | 55—527 |
| 3,341,429 | 9/1967 | Fondrk | 202—197 |

FOREIGN PATENTS

| | | |
|---|---|---|
| 233,351 | 2/1959 | Australia. |

WILBUR L. BASCOMB JR., Primary Examiner

U.S Cl. X.R.

55—227, 228, 229, 259, 267, 468, 486, 525, 527; 202—176, 185A, 160, 206, 197, 205; 203—2, 42, 40; 260—428; 261—117, 126, 151